UNITED STATES PATENT OFFICE.

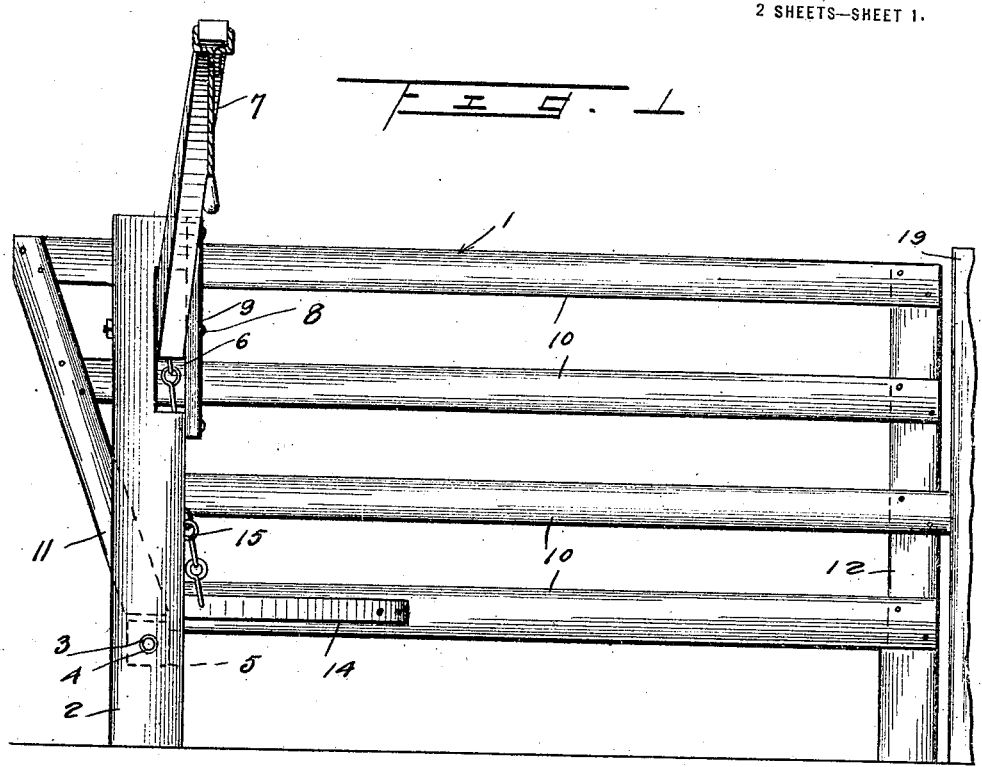
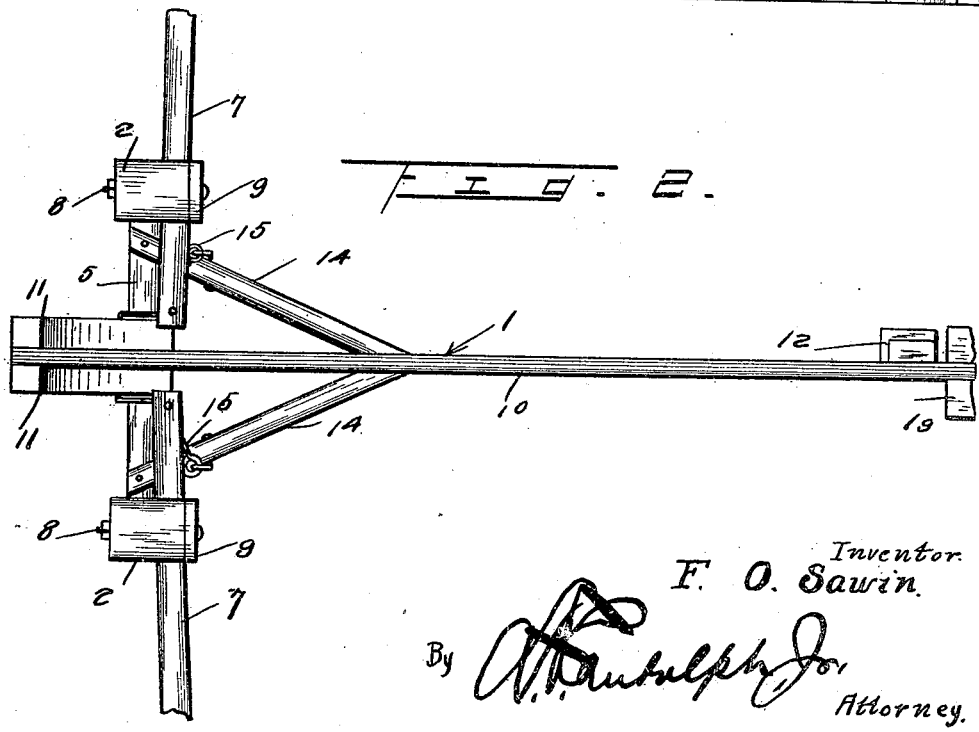

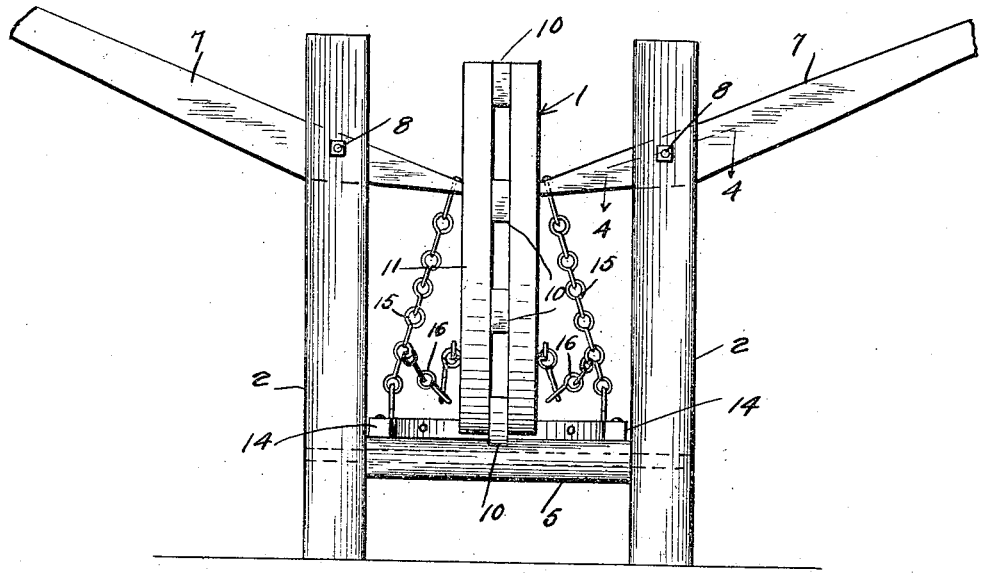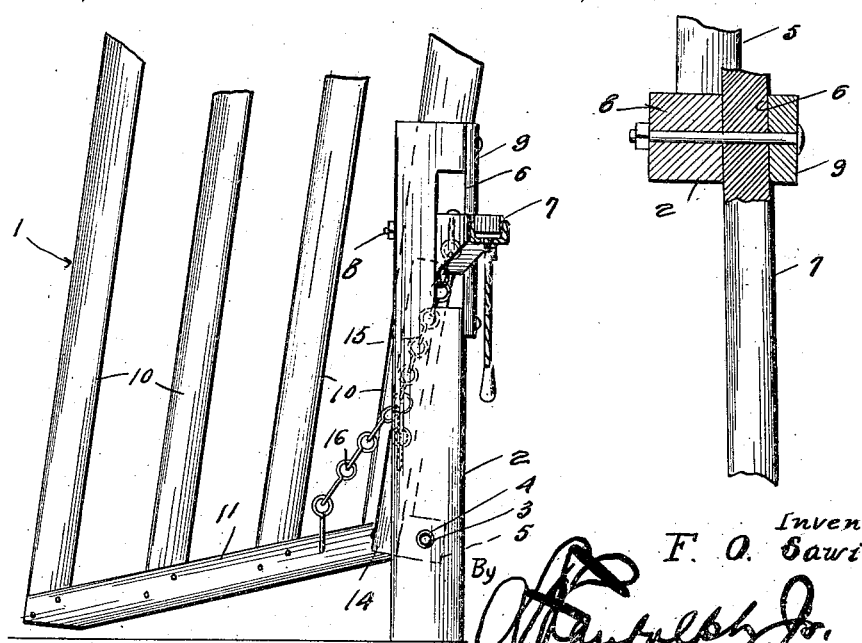

FRANK O. SAWIN, OF SHERIDAN, WYOMING.

GATE.

1,368,844. Specification of Letters Patent. Patented Feb. 15, 1921.

Application filed May 23, 1919. Serial No. 299,113.

*To all whom it may concern:*

Be it known that I, FRANK O. SAWIN, a citizen of the United States, residing at Sheridan, in the county of Sheridan and State of Wyoming, have invented certain new and useful Improvements in Gates; and I do hereby declare the following to be a full, clear, and exact description of the invention, such as will enable others skilled in the art to which it appertains to make and use the same.

This invention relates to gates and the primary object of the invention is to provide an improved gate having means for operating the same at a point distant from the gate, so that the same can be readily opened or closed by a person in a vehicle or the like without necessitating the occupant leaving the vehicle.

Another object of the invention is to provide an improved gate pivoted in a horizontal plane and arranged to swing up and down transversely across the road and having a lever operatively connected thereto for raising and lowering the same.

A further object of the invention is to provide an improved gate having a pair of horizontally disposed pivots formed on one lower end thereof arranged to be received between a pair of supporting posts, said posts carrying operating levers arranged above and to one side of the pivot point, said levers being operatively connected to the gate, whereby to permit of the gate to be readily raised and lowered.

A further object of the invention is to provide a gate of the above character having operating levers carried by the gate posts which are inclined at an angle to the gate posts so as to permit the same to be readily engaged by the occupant of a vehicle so as to operate the gate.

A still further object of the invention is to provide an improved gate of the above character, which is durable and efficient in use, one that is simple and easy to manufacture, and one that can be placed upon the market at a reasonable cost.

With these and other objects in view, the invention consists in the novel construction, arrangement and formation of parts, as will be hereinafter more specifically described, claimed and illustrated in the accompanying drawings, forming a part thereof, in which:

Figure 1 is a side elevation of the improved gate.

Fig. 2 is a plan view of the same.

Fig. 3 is a rear elevation of the gate.

Fig. 4 is a detail vertical section taken on the line 4—4 of Fig. 3, and

Fig. 5 is a detail view illustrating the gate in its raised position.

Referring to the drawings in detail, wherein similar reference characters designate corresponding parts throughout the several views, the numeral 1 generally indicates the improved gate, which includes a pair of gate posts 2 positioned on one side of the road having alined bearings 3 formed in the inner faces thereof which rotatably receive the terminals of a shaft 4 carried by the lower bar 5 secured to the bottom rear edge of the gate 1 and the same projects laterally from each side thereof. This forms means for pivoting the gate so that the same can be moved at a vertical plane across the road, and the posts are provided with grooves 6 in their outer faces, in which are fitted the operating levers 7, which are pivotally mounted upon shafts 8 extending through the posts. A plate 9 extends across the outer faces of the posts to close the recesses or grooves in the outer faces thereof and to form a housing for the operating levers. The posts are turned at an angle to each other, so that the operating levers extend outwardly therefrom toward the road so that the free ends thereof may be readily grasped by the occupant of a vehicle approaching the gate. The levers extend some distance outward from the gate posts and form means whereby a large amount of leverage may be obtained to operate the gate. The gate 1 is, as shown, of the panel type and includes the longitudinally extending bars 10 and the end beams 11 and 12. The inner beam 12 extends upwardly and rearwardly from the bottom of the post and at an angle to the front or outer beam 11, and has its lower end secured to the bar 5. Suitable brace bars 14 connect the lower bar of the gate with the bar 5 and the braces 14 are secured adjacent to the outer ends of the bars and extend inwardly toward the bar 10. The inner terminals of the operating levers 7 have secured thereto chains 15, which extend downwardly therefrom and have their lower ends attached to the brace bars 14. A branch chain 16 is secured to the central portion of the chains and is secured to the rear or inner beam 12 adjacent to the lower end thereof and as the levers are to one side of the pivot or shaft 4 the gate may be readily swung on its pivot.

In operation of the improved device, the outer terminals of the levers are thrown downward, which raises the inner ends thereof upwardly and thus draws the gate therewith, and as the same reaches a certain position the gate becomes overbalanced and then falls rearward by its own weight. When it is desired to close the gate, the lever is again pulled downward, which tightens the branch chain 16 and raises the rear end of the gate upward and when the gate reaches a certain position the same will become overbalanced and then fall to its normal position by its own weight.

The outer free ends of the beams 12 may be inclined so as to form a rest for the gate when the same is in its raised position.

If so desired, suitable ropes may be attached to the free ends of the levers so as to facilitate the grasping thereof. The forward end of the gate may also carry a latch bar for engaging the gate post 19, if so desired.

From the foregoing description, it can be seen that an improved gate is provided of extremely simple and durable construction which can be readily operated at a distance to permit the occupants of vehicles to actuate the gate without leaving the vehicles.

In practice, I have found that the form of my invention illustrated in the accompanying drawings and referred to in the above description, as the preferred embodiment, is the most efficient and practical; yet realizing the conditions concurrent with the adoption of my device will necessarily vary, I desire to emphasize that various minor changes in details of construction, proportion and arrangement of parts may be resorted to, when required without sacrificing any of the advantages of my invention as set forth.

What I claim as new is:

A gate comprising spaced upright gate posts, a lower bar, a horizontal shaft projecting from the opposite ends of said lower bar and rotatably mounted in the lower portions of said post, a gate mounted at its lower rear corner on said lower bar and adapted to swing with the latter between said gate posts, said gate being of the panel type and including a longitudinally extending lower bar and a longitudinally extending upper bar and end beams connecting said bars, a pair of rearwardly diverging brace bars connected at their forward ends to the lower bar and having their rear ends connected with said lower bar, a pair of operating levers pivotally mounted in said spaced gate posts adjacent the upper end thereof and directed toward the sides of said gate, lifting chains secured at one end to the inner ends of said lever and at their lower ends to said brace bars, branch chains connected to the lower portions of said lifting chains and to the rear end post of said gate at a point above the lower bar, the first mentioned chains being connected with the brace bars at a point forwardly of said lower bar, a lever operating member depending from said levers, a stationary gate post spaced from the forward end beam of the gate.

In testimony whereof I affix my signature in presence of two witnesses.

FRANK O. SAWIN.

Witnesses:
 EDWARD R. HARRIS,
 G. A. WALLEY.